US006696942B2

(12) United States Patent
Sweatt

(10) Patent No.: US 6,696,942 B2

(45) Date of Patent: Feb. 24, 2004

(54) EMERGENCY WARNING NETWORK

(76) Inventor: Larry G. Sweatt, 1214 Danberry St., Burkburnett, TX (US) 76354

(*) Notice: Subject to any disclaimer, the term of this patent is extended or adjusted under 35 U.S.C. 154(b) by 41 days.

(21) Appl. No.: 10/156,065

(22) Filed: May 29, 2002

(65) Prior Publication Data

US 2003/0222777 A1 Dec. 4, 2003

(51) Int. Cl.[7] .............................. G08B 1/08; H04Q 7/00

(52) U.S. Cl. ................................ 340/539.1; 340/539.11; 340/539.16; 340/539.17; 342/352; 342/353; 342/357.16

(58) Field of Search .......................... 340/539.1, 539.11, 340/539.16, 539.17, 539.18; 342/352, 353, 357.16

(56) References Cited

U.S. PATENT DOCUMENTS

| | | | | | |
|---|---|---|---|---|---|
| 5,901,226 | A | * | 5/1999 | Brenner et al. | 380/9 |
| 6,084,510 | A | * | 7/2000 | Lemelson et al. | 340/539.1 |
| 6,208,859 | B1 | * | 3/2001 | Halvorson | 455/430 |
| 6,462,665 | B1 | * | 10/2002 | Tarlton et al. | 340/601 |
| 6,608,559 | B1 | * | 8/2003 | Lemelson et al. | 340/539.1 |

* cited by examiner

*Primary Examiner*—Toan N Pham

(74) *Attorney, Agent, or Firm*—Stephen R. Greiner

(57) ABSTRACT

An emergency warning network including a base station for broadcasting a warning signal and a first, earth-orbiting satellite for receiving the warning signal and rebroadcasting such to extend the range of communications of the base station. A first substation receives the warning signal and broadcasts a first forwarding signal in response thereto to a first portable receiver. A second substation also receives the warning signal and broadcasts a second forwarding signal in response thereto via a second, earth-orbiting satellite to a first branch station. The first branch station broadcasts a third forwarding signal in response to the second forwarding signal to a second portable receiver. A second branch station also receives the second forwarding signal via the second, earth-orbiting satellite and broadcasts a fourth forwarding signal to a third portable receiver.

3 Claims, 1 Drawing Sheet

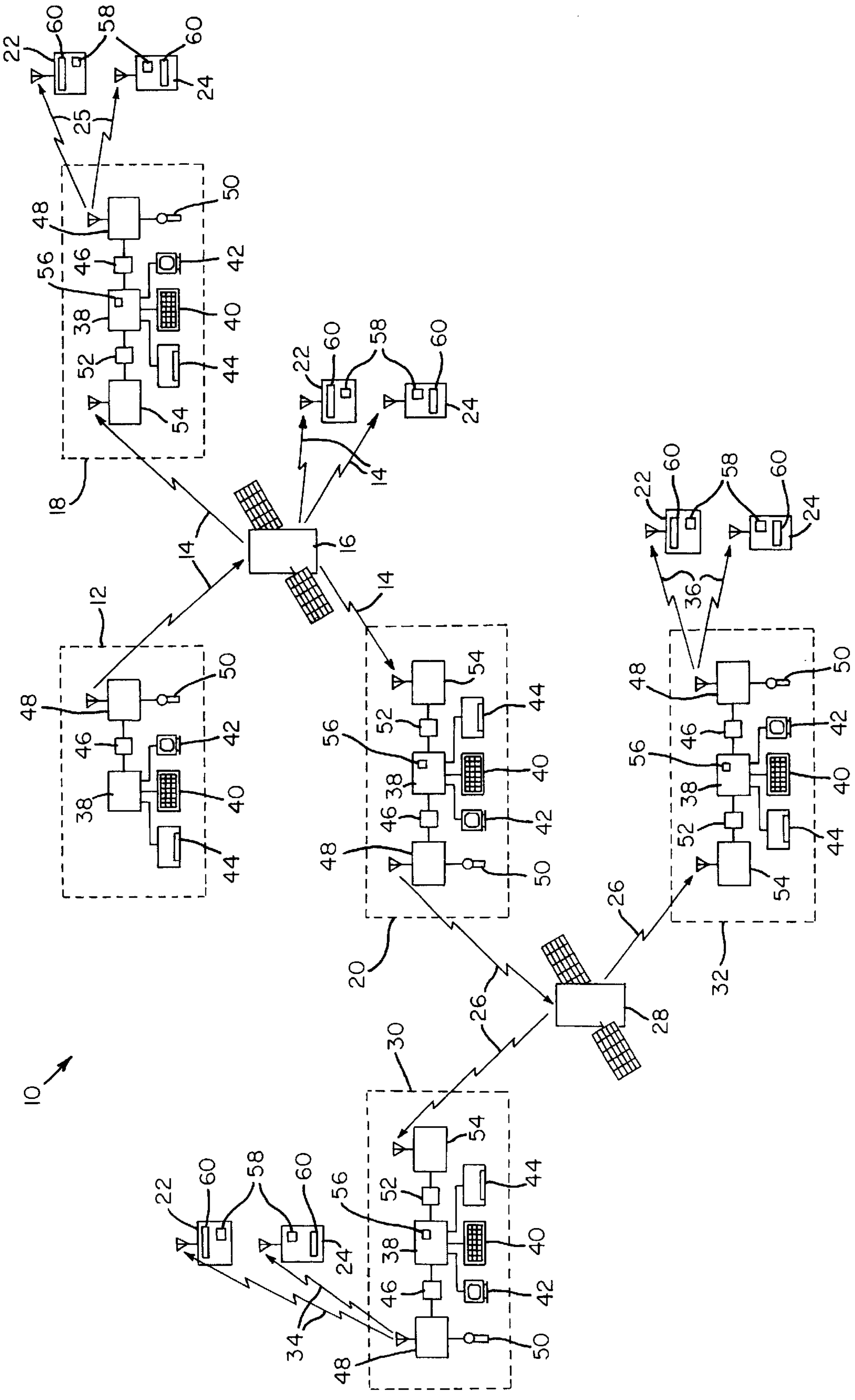
10
12
14
16
18
20
22
24
25
26
28
30
32
34
36
38
40
42
44
46
48
50
52
54
56
58
60

EMERGENCY WARNING NETWORK

FIELD OF THE INVENTION

The present invention relates generally to electrical communications systems and, more particularly, to such systems with particular safety functions.

BACKGROUND OF THE INVENTION

As society has moved into the 21$^{st}$ Century, some of its disaffected members have resorted to acts of extreme violence and terror as a way of being heard. Some of these acts have taken the lives of thousands of people and have injured thousands more. Unfortunately, no one foresees an end to such acts. It is, of course, desirable to warn targeted groups well in advance of such a terrorist act so that precautions can be taken to avoid or minimize the expected harm.

To a certain extent, mass media—radio and television in particular—is effective in rapidly alerting the public of impending, ongoing and completed acts of terrorism. One drawback of relying solely upon radio and television to provide alerts of terrorist activities is that detailed instructions from governmental leaders cannot be provided to those directly involved in providing for the health, safety and welfare of a group of people such as doctors, firemen, and police. The problem of communicating is compounded by our system of government where federal, state and local responsibilities overlap. Thus, it can be difficult to provide a coordinated response to a terrorist threat, natural disaster or similar event.

SUMMARY OF THE INVENTION

In light of the drawbacks associated with using broadcast media to rapidly and accurately disseminate information important to public health, safety and welfare, it is a principal object of the invention to provide an emergency warning network that could be used only by authorized personnel to notify specified people of impending dangers. These dangers might include: terrorist alerts and advisories, fires, explosions, chemical spills, hostage takings, radiation leaks, and the spread of biological agents or gasses to name a few. Apart from news regarding dangers, real time-critical information related to weather and earth movements can be delivered to interested parties by the network.

It is a further object of the invention to provide an emergency warning network of the type described that can be employed to provide time-critical information to users associated with federal, state and local governmental entities in a manner that permits an orderly chain of command to be maintained at all times. Users positioned "on the ground" are able to obtain the information wherever they may be located: at home, in the field, in a vehicle, etc.

It is another object of the invention to provide an emergency warning network of the type described that alerts users of its activation with an audible and visual alarm. Once the alarm has sounded, detailed information may be obtained audibly or visually.

It is an object of the invention to provide improved elements and arrangements thereof in an emergency warning network for the purposes described that is rugged in construction, inexpensive to manufacture, easy to use, and dependable in operation.

Briefly, the emergency warning network in accordance with this invention achieves the intended objects by featuring a base station for broadcasting a warning signal via a first, earth-orbiting satellite to a pair of substations. After receiving warning signal, one substation broadcasts a forwarding signal carrying the message from the base station, perhaps in a modified form, to at least one portable receiver. The other substation broadcasts a similar signal via a second, earth-orbiting satellite to a pair of branch stations. In turn, the branch stations broadcast forwarding signals to one or more portable receivers.

The foregoing and other objects, features and advantages of the present invention will become readily apparent upon further review of the following detailed description of the preferred embodiment as illustrated in the accompanying drawing.

BRIEF DESCRIPTION OF THE DRAWING

The present invention is more readily described with reference to the accompanying drawing that is a schematic diagram of an emergency warning network in accordance with the present invention.

DETAILED DESCRIPTION OF THE PREFERRED EMBODIMENT

Referring now to the drawing, an emergency warning network in accordance with the present invention is shown at 10. Network 10 includes a base station 12 for broadcasting a warning signal 14 via a first, earth-orbiting satellite 16 to a first substation 18 and a second substation 20. After receiving warning signal 14, first substation 18 broadcasts a forwarding signal 25 carrying the message from base station 12, perhaps in a modified form, to portable receivers 22 and 24. Second substation 20, however, broadcasts a similar signal 26 via a second, earth-orbiting satellite 28 to a first branch station 30 and a second branch station 32. Branch stations 30 and 32 broadcast forwarding signals 34 and 36 to portable receivers 22 and 24. Thus, network 10, by its very form, establishes a hierarchy for distributing information.

Base station 12 includes a central processing unit (CPU) 38 to which is operatively connected: a keyboard 40 for entering data into CPU 38, a monitor 42 for scrutinizing the entered data and a printer 44 for generating a copy of the entered data on paper. Data entered into CPU 38 may involve any sort of event that may affect the health, safety and welfare of people inhabiting a given geographic area. CPU 38 continuously assimilates, edits and stores the data and encodes such. The encoded data is relayed by CPU 38 in the form of digital data stream to a terminal node controller (TNC) 46 where it is converted to a form that can be broadcast by radio frequency (RF) transmitter 48 to satellite 16 for relay to substations 18 and 20. A microphone 50 is operatively connected to transmitter 48 so that real-time, live broadcasts of audible information like human speech can be made from base station 12 as part of signal 12 too.

Substation 18 has a CPU 38 with a keyboard 40, a monitor 42 and a printer 44 operating in a conventional fashion so that data can be entered, examined, manipulated and recorded. CPU 38 is connected through a TNC 52 to a receiver 54 so that signal 14 collected by receiver 54 is decoded and fed into CPU 38. Receipt of signal 14 by CPU 38 energizes an audible or visible alarm 56 associated therewith so as to alert a user of the arrival of signal 14. Through keyboard 40, additional data can be entered into CPU 38 that continuously gathers, assimilates, edits and stores the data in encoded form. The encoded data is relayed by CPU 38 to a TNC 46 where it is converted to a form for broadcast by RF transmitter 48 to a desktop radio receiver 22 or a handheld pager 24. A microphone 50 is connected to transmitter 48 so that live speech broadcasts can be made from substation 18 as part of signal 25.

Substations 18 and 20 are substantially identical to one another in terms of function and structure and, in the drawing, their functional features are shown to be identically numbered. It is believed, therefore, that a full understanding of the functional features of substation 20 can be obtained by reading the previous paragraph of this specification. It is of note, however, that transmitter 48 of substation 20 preferably broadcasts an RF signal 26 to satellite 28. Satellite 28, in turn, relays signal 26 to branch stations 30 and 32.

As shown in the drawing, branch stations 30 and 32 are equipped like substations 18 and 20 detailed above. The discussion of the functional features of branch stations 30 and 32, then, will not be belabored. Noteworthy, however, is the fact that transmitters 48 of branch stations 30 and 32 broadcast to portable receivers 22 and 24.

All portable receivers 22 and 24 include alarms 58 to indicate to a user that a signal has been received. Each alarm 58 may be a tone generator capable of emitting audible sound. On the other hand, each alarm 58 may include an array of six, light emitting diodes (LEDs) with the colors: white, green, blue, yellow, orange and red to convey an impression of the immediate likelihood of an act of terror as proposed by the Office of Homeland Security. The color white would be employed with all messages not involving terrorist threats. It is anticipated that each of the LEDs in the array would be represented by a unique sequence of numbers or code that, when input into CPUs 38 through keyboards 40 and broadcast by transmitters 48 would cause corresponding one of the LEDs to be illuminated. Alarms 56 may be constructed and configured like alarms 58.

Each portable receiver 22 and 24 may also include an LCD display 60 for producing any written message associated with signals 14, 25, 34, or 36. The written messages will generally correspond to the different levels of threats issued by the Office of Homeland Security. Display 60 may exhibit the word "low" for a green alert, "guarded" for blue, "elevated" for yellow, "high" for orange, and "severe" for red to correspond with each level of threat. Of course, the exact content of the written message will be determined by inputs made with keyboards 40. A reset button (not shown) on receivers 22 and 24 permit a user to deenergize alarm 58, clear LCD display 60, and place receiver 22 or 24 in a "stand-by" mode waiting for the next signal 14, 25, 34, or 36.

Receivers 22 and 24 may be adjusted using conventional switches or other means (not shown). For example, receivers 22 and 24 can, and will be, made to receive only signals 14, 25, 34 and 36 at a specified frequency. These adjustments are preferably made at the time that receivers 22 and 24 is manufactured or distributed, but could be accomplished by a user. Of course, receivers 22 and 24 may be made to receive RF weather bulletins directly from NOAA or to receive signals from an alternative source.

It is expected that network 10 would be used principally by governmental agencies to distribute information from federal to local governmental entities in times of crisis. Base station 12, then, would be placed in the possession of an authority responsible for emergency preparedness on a national basis. Substations 18 and 20 that receive signal 14 from base station 12 would be placed, respectively, in the possession of a federal entity having a regional presence such as a military base and in the possession of a state agency, say, the state police force. In turn, branch stations 30 and 32 that receive signal 26 from substation 20 would be operated by local entities, fire and sheriffs departments and the like.

It is likely that base station 10 would be operated by the new Office of Homeland Security or a similar agency to broadcast messages regarding events that pose a threat to the health, safety and welfare of the public. A typical message carried by signal 14 possesses: a writing capable of visualization on monitor 42 of substation 18, a code to energize alarm 56 of substation 18, as well as a voice transmission capable of being transduced by a speaker perhaps positioned within monitor 42 of substation 18. Signal 14 would preferably be encoded before broadcast and decoded using conventional means by CPU 38 of substation 18.

When substation 18 receives signal 14 relayed by satellite 16, CPU 38 causes alarm 56 to be energized. Then, the voice transmission is emitted from monitor 42. Should the operator of substation 18, say, the army, desire additional information, it may be gleaned from monitor 42 that will have produced the writing carried by signal 14. Now, the operator of substation 18 employing his keyboard 40 and microphone 50 may generate a new signal 25 carrying a new message for broadcast to receivers 22 and 24 located in the field where users, like army troops, can act on the message that will be seen on LCD display 60 and produced audibly through an internal speaker (not shown).

In some instances, it may be preferable for the operator of base station 12 to bypass substation 18 and send a message directly from satellite 16 to portable receivers 22 and 24 in the field. This is easily accomplished by tuning receivers 22 and 24 so that they are capable of detecting and decoding signals 14 from satellite 16 as shown schematically in the drawing. Thus, if substation 18 became inoperative for any reason, then a message, even an incomplete one, can be delivered to a few users in the field.

Substation 20 would normally be operated by a state's emergency management director. After receiving signal 14 and reviewing the contents of a message carried thereby, a new message is entered into CPU 38 of substation 20 using keyboard 40 for broadcast via transmitter 48 to branch stations 30 and 32. Branch stations 30 and 32 are free to act upon the message carried by signal 26 and to generate new messages with their own equipment for broadcast as RF signals 34 and 36 to portable receivers 22 and 24 in the possession of field agents where they may be seen on displays 60 and heard through internal speakers. Thus, any threats or other dangerous events described by the operator of base station 12 are passed through network 10 in a secure an efficient manner with those in a supervisory position staying informed and being able to deliver messages to those under their command.

While the invention has been described with a high degree of particularity, it will be appreciated by those skilled in the art that modifications may be made thereto. For example, network 10 may be provided with any number of substations, branch stations, and portable receivers. Therefore, it is to be understood that the present invention is not limited to the sole embodiment described above, but encompasses any and all embodiments within the scope of the following claims.

I claim:

1. An emergency warning system, comprising:

a base station for broadcasting a warning signal;

a first, earth-orbiting satellite for receiving said warning signal and rebroadcasting such so as to extend the range of communications of said base station;

a first substation for receiving said warning signal from said first, earth-orbiting satellite and for broadcasting a first forwarding signal in response thereto;

a first portable receiver for receiving said first forwarding signal from said first substation;

a second substation for receiving said warning signal from said first, earth-orbiting satellite and for broadcasting a second forwarding signal in response thereto;

a second, earth-orbiting satellite for receiving said second forwarding signal and rebroadcasting such so as to extend the range of communications of said second substation;

a first branch station for receiving said second forwarding signal from said second, earth-orbiting satellite and for broadcasting a third forwarding signal in response thereto;

a second portable receiver for receiving said third forwarding signal from said first branch station;

a second branch station for receiving said second forwarding signal from said second, earth-orbiting satellite and for broadcasting a fourth forwarding signal; and, a third portable receiver for receiving said fourth forwarding signal from said second branch station.

2. An emergency warning system, comprising:

a base station for broadcasting a warning signal, said base station including:

a CPU for assimilating, editing and storing data;

a keyboard connected to said CPU for entering data into said CPU;

a monitor connected to said CPU for scrutinizing data entered into said CPU;

a printer connected to said CPU for generating a copy of the data entered into said CPU;

an RF transmitter connected to said CPU for broadcasting said warning signal; and, a microphone connected to said transmitter for entraining human speech in said warning signal;

a first, earth-orbiting satellite for receiving said warning signal and rebroadcasting such so as to extend the range of communications of said base station;

a first substation for receiving said warning signal from said first, earth-orbiting satellite and for broadcasting a first forwarding signal in response thereto;

a first portable receiver for receiving said first forwarding signal from said first substation;

a second substation for receiving said warning signal from said first, earth-orbiting satellite and for broadcasting a second forwarding signal in response thereto;

a second, earth-orbiting satellite for receiving said second forwarding signal and rebroadcasting such so as to extend the range of communications of said second substation;

a first branch station for receiving said second forwarding signal from said second, earth-orbiting satellite and for broadcasting a third forwarding signal in response thereto;

a second portable receiver for receiving said third forwarding signal from said first branch station;

a second branch station for receiving said second forwarding signal from said second, earth-orbiting satellite and for broadcasting a fourth forwarding signal; and, a third portable receiver for receiving said fourth forwarding signal from said second branch station.

3. An emergency warning system, comprising:

a base station for broadcasting a warning signal, said base station including:

a first CPU for assimilating, editing and storing data;

a first keyboard connected to said first CPU for entering data into said first CPU;

a first monitor connected to said first CPU for scrutinizing data entered into said first CPU;

a first printer connected to said first CPU for generating a copy of the data entered into said first CPU;

a first RF transmitter connected to said first CPU for broadcasting said warning signal; and, a first microphone connected to said first transmitter for entraining human speech in said warning signal;

a first, earth-orbiting satellite for receiving said warning signal and rebroadcasting such so as to extend the range of communications of said base station;

a first substation for receiving said warning signal from said first, earth-orbiting satellite and for broadcasting a first forwarding signal in response thereto, said first substation including:

a second CPU for assimilating, editing and storing data;

a first receiver connected to said second CPU for receiving said warning signal and delivering such in the form of data to said second CPU;

a second keyboard connected to said second CPU for entering data into said second CPU;

a second monitor connected to said second CPU for scrutinizing data entered into said second CPU;

a second printer connected to said second CPU for generating a copy of the data entered into said second CPU;

a second RF transmitter connected to said second CPU for broadcasting said first forwarding signal; and, a second microphone connected to said second transmitter for entraining human speech in said first forwarding signal;

a first portable receiver for receiving said first forwarding signal from said first substation;

a second substation for receiving said warning signal from said first, earth-orbiting satellite and for broadcasting a second forwarding signal in response thereto, said second substation including:

a third CPU for assimilating, editing and storing data;

a second receiver connected to said third CPU for receiving said warning signal and delivering such in the form of data to said third CPU;

a third keyboard connected to said third CPU for entering data into said third CPU;

a third monitor connected to said third CPU for scrutinizing data entered into said third CPU;

a third printer connected to said third CPU for generating a copy of the data entered into said third CPU;

a third RF transmitter connected to said third CPU for broadcasting said second forwarding signal; and, a third microphone connected to said third transmitter for entraining human speech in said second forwarding signal;

a second, earth-orbiting satellite for receiving said second forwarding signal and rebroadcasting such so as to extend the range of communications of said second substation;

a first branch station for receiving said second forwarding signal from said second, earth-orbiting satellite and for broadcasting a third forwarding signal in response thereto, said first branch station including:

a fourth CPU for assimilating, editing and storing data;

a third receiver connected to said fourth CPU for receiving said second forwarding signal and delivering such in the form of data to said fourth CPU;

a fourth keyboard connected to said fourth CPU for entering data into said fourth CPU;

a fourth monitor connected to said fourth CPU for scrutinizing data entered into said fourth CPU;

a fourth printer connected to said fourth CPU for generating a copy of the data entered into said fourth CPU;

a fourth RF transmitter connected to said fourth CPU for broadcasting said third forwarding signal; and, a fourth microphone connected to said fourth transmitter for entraining human speech in said third forwarding signal;

a second portable receiver for receiving said third forwarding signal from said first branch station;

a second branch station for receiving said second forwarding signal from said second, earth-orbiting satellite and for broadcasting a fourth forwarding signal, said second branch station including:

a fifth CPU for assimilating, editing and storing data;

a fourth receiver connected to said fifth CPU for receiving said second forwarding signal and delivering such in the form of data to said fifth CPU;

a fifth keyboard connected to said fifth CPU for entering data into said fifth CPU;

a fifth monitor connected to said fifth CPU for scrutinizing data entered into said fifth CPU;

a fifth printer connected to said fifth CPU for generating a copy of the data entered into said fifth CPU;

a fifth RF transmitter connected to said fifth CPU for broadcasting said fourth forwarding signal; and, a fifth microphone connected to said fifth transmitter for entraining human speech in said fourth forwarding signal; and, a third portable receiver for receiving said fourth forwarding signal from said second branch station.

* * * * *